(12) United States Patent
van Bennekom et al.

(10) Patent No.: US 6,936,652 B2
(45) Date of Patent: Aug. 30, 2005

US006936652B2

(54) METHOD FOR IMPROVING THE PAINT ADHESION OF COMPATIBILIZED POLYPHENYLENE ETHER-POLYAMIDE COMPOSITIONS

(75) Inventors: Antoinette C. M. van Bennekom, Hansweert (NL); Josephus Gerardus M. van Gisbergen, Bergen op Zoom (NL); Sai-Pei Ting, Slingerlands, NY (US)

(73) Assignee: General Electric Company, Schenectady, NY (US)

( * ) Notice: Subject to any disclaimer, the term of this patent is extended or adjusted under 35 U.S.C. 154(b) by 152 days.

(21) Appl. No.: 10/289,664

(22) Filed: Nov. 7, 2002

(65) Prior Publication Data

US 2003/0130406 A1 Jul. 10, 2003

Related U.S. Application Data

(63) Continuation-in-part of application No. 09/635,041, filed on Aug. 4, 2000, now abandoned.
(60) Provisional application No. 60/201,805, filed on May 4, 2000.

(51) Int. Cl.⁷ ............................ C08K 3/04; C08K 5/13
(52) U.S. Cl. ...................... 524/496; 524/158; 524/170; 524/349; 524/350; 524/351; 524/458; 524/495; 524/902; 524/904; 427/316; 427/400; 427/421; 427/456
(58) Field of Search ................................ 524/158, 170, 524/349–351, 458, 495–496, 902, 904, 505; 427/316, 400, 421, 458

(56) References Cited

U.S. PATENT DOCUMENTS

| | | | |
|---|---|---|---|
| 3,078,254 A | 2/1963 | Zelinski et al. | |
| 3,265,765 A | 8/1966 | Holden et al. | |
| 3,297,793 A | 1/1967 | Dollinger | |
| 3,402,159 A | 9/1968 | Hsieh | |
| 3,594,452 A | 7/1971 | De La Mare et al. | |
| 3,644,278 A | 2/1972 | Klemchuk | |
| 3,778,464 A | 12/1973 | Klemchuk | |
| 4,124,574 A | 11/1978 | Preston et al. | |
| 4,315,086 A | 2/1982 | Ueno et al. | |
| 4,325,863 A | 4/1982 | Hinsken et al. | |
| 4,338,244 A | 7/1982 | Hinsken et al. | 524/129 |
| 4,433,088 A | 2/1984 | Haaf et al. | |
| 4,578,429 A | 3/1986 | Gergen et al. | |
| 4,590,231 A | 5/1986 | Seltzer et al. | |
| 4,600,741 A | 7/1986 | Aycock et al. | |
| 4,642,358 A | 2/1987 | Aycock et al. | |
| 4,659,760 A | 4/1987 | van der Meer | |
| 4,729,854 A | 3/1988 | Mizata et al. | |
| 4,732,938 A | 3/1988 | Grant et al. | |
| 4,857,575 A | 8/1989 | Meer et al. | |
| 4,970,272 A | 11/1990 | Gallucci | |
| 4,972,020 A | 11/1990 | Shiraki et al. | |
| 4,975,479 A * | 12/1990 | Satake et al. | 524/100 |
| 4,997,612 A | 3/1991 | Gianchandai et al. | |
| 5,039,723 A | 8/1991 | Haruna et al. | |
| 5,084,523 A | 1/1992 | Neugebauer et al. | |
| 5,112,681 A | 5/1992 | Myojo et al. | |
| 5,120,801 A | 6/1992 | Chambers | |
| 5,156,920 A | 10/1992 | Aycock et al. | |
| 5,166,238 A * | 11/1992 | Nakano et al. | 524/120 |
| 5,175,211 A | 12/1992 | Sanada et al. | |
| 5,175,312 A | 12/1992 | Dubs et al. | |
| 5,191,024 A | 3/1993 | Shibata et al. | |
| 5,198,303 A | 3/1993 | Greenlee et al. | |
| 5,200,450 A | 4/1993 | Blinne et al. | |
| 5,278,231 A | 1/1994 | Chundury | |
| 5,374,677 A | 12/1994 | Nishio et al. | |
| 5,382,627 A | 1/1995 | Yoshimura et al. | |
| 5,468,530 A | 11/1995 | Gotz et al. | |
| 5,607,624 A | 3/1997 | Nesvadba et al. | |
| 5,670,576 A | 9/1997 | Takatani et al. | 525/132 |
| 5,674,928 A | 10/1997 | Chisholm et al. | 524/147 |
| 5,675,576 A | 10/1997 | Takafani et al. | |
| 5,717,014 A | 2/1998 | Ohkawachi et al. | |
| 5,741,846 A | 4/1998 | Lohmeijer et al. | |
| 5,844,029 A | 12/1998 | Prabhu et al. | |
| 5,872,187 A | 2/1999 | Takafani et al. | |
| 5,880,191 A | 3/1999 | Prabhu et al. | |
| 5,886,094 A | 3/1999 | Sanadz et al. | |
| 6,005,050 A | 12/1999 | Okada et al. | |
| 6,103,798 A | 8/2000 | Prabhu et al. | |
| 6,107,415 A | 8/2000 | Silvi et al. | |
| 6,180,716 B1 | 1/2001 | Majumdar | |
| 6,214,915 B1 | 4/2001 | Avakian et al. | |
| 6,224,791 B1 | 5/2001 | Stevenson et al. | |
| 6,346,571 B1 | 2/2002 | Dharmarajon et al. | |

FOREIGN PATENT DOCUMENTS

| | | |
|---|---|---|
| EP | 0 248 526 | 4/1987 |
| EP | 0 394 005 | 4/1990 |
| GB | 1264741 | 2/1972 |

OTHER PUBLICATIONS

International Search Report for PCT/US 01/40377 Oct. 4, 2001.

* cited by examiner

Primary Examiner—Peter Szekely

(57) ABSTRACT

Thermoplastic resin composition are provided that comprise a thermoplastic resin and an amount of antioxidant effective to increase the adhesion of paint to an article made from the composition. Also provided are methods to improve the paint adhesion of articles wherein the articles have been subjected to a temperature of at least about 330° F. for period of at least about 10 minutes. In a preferred embodiment, the antioxidant, also known as a stabilizer, or mixture of stabilizers is selected from the group consisting of the phenolic antioxidants, the 3-arylbenzofuranones, the hindered amine stabilizers, the ultraviolet light absorbers, the alkaline metal salts of fatty acids, the hydrotalcites, the epoxydized soybean oils, the hydroxylamines, the tertiary amine oxides, thermal reaction products of tertiary amine oxides, the thiosynergists, and mixture containing at least one of the foregoing.

26 Claims, 5 Drawing Sheets

(a)

(b)

(c)

METHOD FOR IMPROVING THE PAINT ADHESION OF COMPATIBILIZED POLYPHENYLENE ETHER-POLYAMIDE COMPOSITIONS

CROSS REFERENCE TO RELATED APPLICATIONS

This application is a continuation in part of application Ser. No. 09/635,041 filed on Aug. 4, 2000, now abandoned, which claims the benefit of U.S. Provisional Application No. 60/201,805, filed May 4, 2000, the entire contents of which are incorporated herein by reference.

FEDERALLY SPONSORED RESEARCH

Not Applicable

BACKGROUND OF THE INVENTION

1. Field of the Invention

The invention relates to methods to increase the paint adhesion of an article made from compatibilized polyphenylene ether-polyamide resin blends.

The invention also relates to the compositions and articles, e.g., automotive components, made from the compositions.

2. Brief Description of the Related Art

Poly(phenylene ether) resins (referred to hereafter as "PPE") are commercially attractive materials because of their unique combination of physical, chemical, and electrical properties. Furthermore, the combination of these resins with polyamide resins into compatibilized blends results in additional overall properties such as chemical resistance, high strength, and high flow. Examples of such compatibilized blends can be found in U.S. Pat. No. 4,315,086 (Ueno, et al); U.S. Pat. No. 4,659,760 (van der Meer); and U.S. Pat. No. 4,732,938 (Grant, et al).

The physical properties of PPE/polyamide blends make them attractive for a variety of end-use articles in the automotive market, especially for various painted exterior components. However, when these compositions are to be utilized in automotive applications it is generally desirable to improve their impact properties, especially when used as exterior automotive body panels, bumpers, and the like, by adding impact modifiers.

Some of the more desirable applications, for example, automotive fenders require the molded plastic parts affixed to the automobile frame to go through high temperature ovens used to cure the anti-corrosion coating that has been applied to the metal panels. High temperature cures are especially important in the so-called "E-coating" process, in which an epoxy coating is applied to the metal parts and then cured prior to electrostatic painting, In electrostatic painting, a uniform coating of paint is established as the result of an electrical attraction between the metal part and positively charged paint particles. The ovens typically reach temperatures of about 165° C. to about 230° C. or higher for periods of 10 to 50 minutes or longer. These temperatures often cause low molecular weight ingredients or reaction products present in the polyphenylene ether polyamide compositions to migrate to the surface, leading to the formation of a film on the surface of the respective article. Such films are undesirable and often give rise to paint adhesion problems. The ability to withstand the time and temperature of the ovens without distortion limits the success of many plastic resins. Moreover, paint adhesion issues with plastic panels after passing through the ovens has also limited their acceptance. It is therefore apparent that a need continues to exist for improved thermoplastic compositions and method to improve paint adhesion on such compositions for painted automotive components.

SUMMARY OF THE INVENTION

The present invention provides methods, compositions, and articles having improved paint adhesion properties. The invention comprises an amount of antioxidant effective to increase the adhesion of paint to an article made from the thermoplastic resin. In a preferred embodiment, the article has been subjected to a temperature of about at least about 330° F. for a period of at least about 10 minutes. In a preferred embodiment, the antioxidant, also known as a stabilizer, or mixture of stabilizers is selected from the group consisting of the phenolic antioxidants, the 3-arylbenzofuranones, the hindered amine stabilizers, the ultraviolet light absorbers, the alkaline metal salts of fatty acids, the hydrotalcites, the epoxydized soybean oils, the hydroxylamines, the tertiary amine oxides, thermal reaction products of tertiary amine oxides, the thiosynergists, and mixtures containing at least one of the foregoing.

A paintable composition comprises the a needed product of a thermoplastic composition; carbon nanotubes; about 1 to about 20 wt % of saturated styrenic impact modifiers; and an amount of greater than about 0.4 parts by weight per hundred parts of the total weight of the composition of an antioxidant, wherein the composition has been annealed at a temperature of greater than or equal to about 165° C. for a time period of greater than or equal to about 10 minutes.

A method of making a paintable article comprises melt blending a thermoplastic composition; carbon nanotubes; about 1 to about 20 wt % based upon the total weight of the composition, of saturated styrenic impact modifiers and an amount of greater than about 0.4 parts per hundred, based upon the total weight of the composition, of an antioxidant; injection molding the melt blend to form an article;

annealing the article at a temperature of greater than or equal to about 165° C. for a time period of greater than or equal to about 10 minutes; and applying paint to the article.

DETAILED DESCRIPTION OF THE INVENTION

Figure 1:
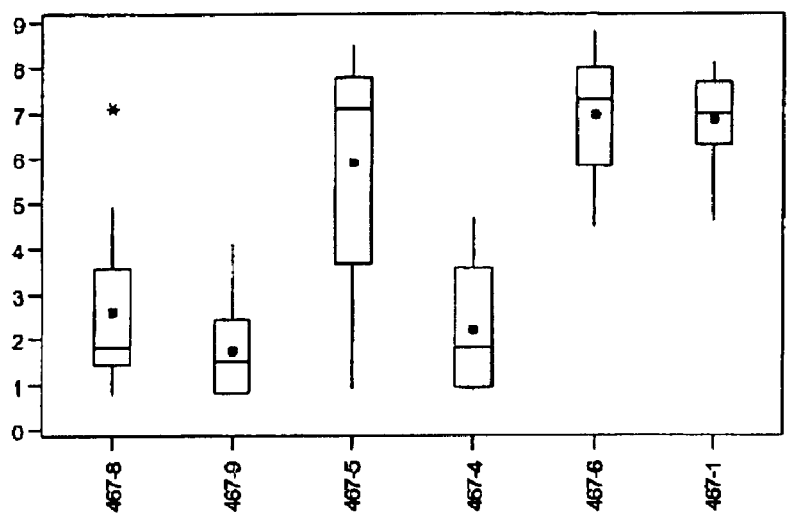
FIG. 1 is a boxplot of the relative bond strengths of painted molded articles made from the compositions in Table 1.

It has been unexpectedly discovered that the addition of an amount of greater than or equal to about 0.4 phr of an antioxidant to a thermoplastic composition comprising a compatibilized composition of polyphenylene ether and polyamide and further containing impact modifiers, wherein the impact modifiers are a combination of polystyrene-poly (ethylene-butylene)-polystyrene triblock copolymer (SEBS) and polystyrene-poly(ethylene-propylene) diblock copolymer (SEP), permits good paint adhesion to articles made from the composition, after the composition or the article is annealed to a temperature of greater than or equal to about 165° C. for a time period of greater than or equal to about 10 minutes.

Compatibilized compositions of polyphenylene ethers and polyamides are generally manufactured via reactive compounding techniques wherein a compatibilizing agent is added to the composition. Without being limited by theory it is generally believed that the compatibilizing agent brings about a reaction between the polyphenylene ether and the polyamide and that these reaction products improve the compatibility between the polyphenylene ether and polyamide. This improved compatibility results in enhanced physical properties such as, for example, increased ductility. Illustrative compatibilizing agents for compositions of polyphenylene ether and polyamide include citric acid, maleic anhydride, fumaric acid, malic acid, as well as various derivatives of the foregoing.

The ratio of polyphenylene ether to polyamide can vary widely but is preferably adjusted so that the polyamide remains the continuous phase. Preferably the polyamide is present in an amount of greater than or equal to about 40% by weight of the total composition. Increasing the level of the polyamide results in enhanced ductility and flow and is often preferred. The compositions may contain more than one type of polyamide such as a composition of nylon 6 and nylon 6,6. Other variables, such as for example, the amine to acid endgroup ratio of the polyamide, the degree of branching and relative viscosity of the polyamide contained within the composition may also be changed as desired.

Suitable polyphenylene ethers include poly(2,6-dimethylphenylene ether) as well as the copolymers made from 2,6-dimethylphenol and 2,3,6-trimethylphenol. Preferably the polyphenylene ether is a high glass transition temperature copolymer made from 2,6-dimethylphenol and 2,3,6-trimethylphenol in a monomer weight ratio of about 1:3 to about 3:1 respectively, with ratios of about 4:6 to about 6:4 respectively, more preferred. High glass transition temperature polyphenylene ether copolymers increase the heat resistance capability of the compatibilized composition of polyphenylene ether and polyamide as compared with the composition manufactured utilizing only poly(2,6-dimethylphenylene ether) with polyamide.

The present invention also contains an amount of a stabilizer or mixture of stabilizers effective to enhance the paint adhesion characteristics of the composition, wherein the stabilizer or mixture thereof is selected from the group consisting of the phenolic antioxidants, the hindered amine stabilizers, the ultraviolet light absorbers, the alkaline metal salts of fatty acids, the hydroxyl amines, and the thisoynergists.

The phenolic antioxidants useful in the present compositions embrace a large family of compounds, examples of which are given below.

Simple 2,6-dialkylphenol, such as, for example, 2,6-di-tert-butyl-4-methylphenol, 2-tert-butyl-4,6-di-methylphenol, 2,6-di-tert-butyl-4-methoxymethylphenol 2,6-dioctadecyl-4-methylphenol and 2,6-di-tert-butylphenol may be utilized in the compositions. Vitamin E and derivatives of vitamin E are also useful phenolic antioxidants, which may also be utilized in the compositions.

Derivatives of alkylated hydroquinones, such as for example, 2,5-di-tert-butyl-hydroquinone, 2,5-di-tert-amylhydroquinone, 2,6-di-tert-butyl-hydroquinone, 2,5-di-tert-butyl-4-hydroxy-anisole, 3,5-di-tert-butyl-4-hydroxy-anisole, tris-(3,5-di-tert-butyl-4-hydroxyphenyl)phosphite, 3,5-di-tert-butyl-4-hydroxyphenyl stearate, bis-(3,5-di-tert-butyl-4-hydroxyphenyl)adipate and combinations comprising at least one of the foregoing may also be utilized to increase paint adhesion in the compositions.

Hydroxylated thiodiphenyl ethers, such as, for example, 2,2'-thio-bis-(6-tert-butyl-4-methylphenol), 2,2'-thio-bis-(4-octylphenol), 4,4'-thio-bis-(6-tert-butyl-3-methylphenol), 4,4'-thio-bis-(3,6-di-sec-amylphenol), 4,4'-thio-bis-(6-tert-butyl-2-methylphenol), 4,4'-bis-(2,6-dimethyl-4-hydroxyphenyl)disulfide and combinations comprising at least one of the foregoing hydroxylated thiodiphenyl ethers may also be utilized to increase paint adhesion in the compositions.

Alkylidene-bisphenols, such as, for example, 2,2'-methylene-bis-(6-tert-butyl-4-methylphenol), 2,2'-methylene-bis-(6-tert-butyl-4-ethylphenol), 4,4'-methylene-bis-(6-tert-butyl-2-methylphenol), 4,4'-methylene-bis-(2,6-di-tert-butylphenol), 2,6-di(3,-tert-butyl-5-methyl-2-hydroxybenzyl)-4-methylphenol, 2,2'-methylene-bis-[4-methyl-6-(alpha-methylcyclohexyl)-phenol], 1,1-bis(3,5-dimethyl-2-hydroxyphenyl)-butane, 1,1-bis-(5-tert-butyl-4-hydroxy-2-methylphenyl)-butane, 2,2-bis-(3,5-di-tert-butyl-4-hydroxyphenyl)-propane, 1,1,3-tris-(5-tert-butyl-4-hydroxy-2-methylphenyl)-butane, 2,2-bis-(5-tert-butyl-4-hydroxy-2-methylphenyl)-4-n-dodecylmercaptobutane, 1,1,5,5-tetra-(5-tert-butyl-4-hydroxy-2-methylphenyl)-pentane, ethylene glycol bis-[3,3-bis-(3-tert-butyl-4-hydroxyphenyl)-butyrate] and combinations comprising at least one of the foregoing alkylidene-bisphenols may also be utilized to increase paint adhesion in the compositions.

O-, N- and S-benzyl compounds, such as, for example, 3,5,3',5'-tetra-tert-butyl-4,4'-dihydroxydibenzyl ether, octadecyl 4-hydroxy-3,5-dimethylbenzyl-mercaptoacetate, tris-(3,5-di-tert-butyl-4-hydroxybenzyl)-amine, bis-(4-tert-butyl-3-hydroxy-2,6-dimethylbenzyl)dithioterephthalate and combinations comprising at least one of the foregoing may also be utilized to increase paint adhesion in the compositions.

Hydroxybenzylated malonates, such as for example, dioctadecyl 2,2-bis-(3,5-di-tert-butyl-2-hydroxybenzyl)-malonate, dioctadecyl 2-(3-tert-butyl-4-hydroxy-5-methylbenzyl)-malonate, di-dodecylmercapto-ethyl 2,2-bis-(3,5-di-tert-butyl-4-hydroxybenzyl)-malonate, di-[4-(1,1,3,3-tetramethylbutyl)-phenyl]2,2-bis-(3,5-di-tert-butyl-4-hydroxybenzyl)-malonate and combinations comprising at least one of the foregoing hydroxybenzylated malonates may also be utilized to increase paint adhesion in the compositions.

Hydroxybenzyl-aromatic compounds, such as, for example, 1,3,5-tri-(3,5-di-tert-butyl-4-hydroxybenzyl)-2,4,6-trimethylbenzene, 1,4-di-(3,5-di-tert-butyl-4-hydroxybenzyl)-2,3,5,6-tetramethylbenzene, 2,4,6-tri(3,5-di-tert-butyl-4-hydroxybenzyl)-phenol and combinations comprising at least one of the foregoing hydroxybenzyl-aromatic compounds may also be utilized to increase paint adhesion in the compositions.

S-triazine compounds, such as, for example, 2,4-bisoctylmercapto-6-(3,5-di-tert-butyl-hydroxl-anilino)-s-triazine, 2-octylmercapto, 4,6-bis-(3,5-di-tert-butyl-4-hydroxy anilino)-s-triazine, 2-octylmercapto-4,6-bis-(3,5-di-tert-butyl-4-hydroxyphenoxy)-s-triazine, 2,4,6-tris-(3,5-di-tert-butyl-4-hydroxyphenoxy)-s-triazine, 2,4,6-tris-(3,5-di-tert-butyl-4-hydroxyphenylethyl)-s-triazine, 1,3,5-tris-(2, 6-di-methyl-3-hydroxy-4-tert-butylbenzyl)isocyanurate, 1,3-5-tris-(3,5-di-tert-butyl-4-hydroxybenzyl)isocyanurate and combinations comprising at least one of the foregoing may also be utilized to increase paint adhesion in the compositions.

Amides of beta-(3,5-di-tert-butyl-4-hydroxyphenyl)-propionic acid, such as, for example, 1,3,5-tris-(3,5-di-tert-butyl-4-hydroxyphenyl-propionyl)-hexahydro-s-triazine, N,N'-di(3,5-di-tert-butyl-4-hydroxyphenyl-propionyl)-hexamethylenediamine, N,N'-bis-beta-(3,5-di-t-butyl-4-hydroxyphenyl)-propionylhydrazine and combinations comprising at least one of the foregoing amides of beta-(3,5-di-tert-butyl-4-hydroxyphenyl)-propionic acid may be utilized to increase paint adhesion in the compositions.

Esters of beta-(3,5-di-tert-butyl-4-hydroxyphenyl)-propionic acid with monohydric or polyhydric alcohols, such as, for example with methanol, ethanol, octadecanol, 1,6-hexanediol, 1,9-nonanediol, ethylene glycol, 1,2-propanediol, diethylene glycol, thiodiethylene glycol, triethylene glycol, neopentylglycol, pentaerythritol, 3-thia-undecanol, 3-thia-pentadecanol, trimethylhexanediol, trimethylolethane, trimethylolpropane, tris-hydroxyethyl isocyanurate, 4-hydroxymethyl-1-phospha-2,6,7-trioxabicyclo-[2.2.2]octane and combinations comprising at least one of the foregoing esters of beta-(3,5-di-tert-butyl-4-hydroxyphenyl)-propionic acid with monohydric or polyhydric alcohols may be utilized to increase paint adhesion in the compositions.

Esters of beta-(5-tert-butyl-4-hydroxyl-3-methylphenyl)-propionic acid with monohydric or polyhydric alcohols, such as, for example, with methanol, ethanol, octadecanol, 1,6-hexanediol, 1,9-nonanediol, ethylene glycol, 1,2-propanediol, diethylene glycol, triethylene glycol, thiodiethylene glycol, neopentylglycol, pentaerythritol, 3-thia-undecanol, 3-thia-pentadecanol, trimethylhexanediol, trimethylolethane, trimethylolpropane, tris-hydroxyethyl isocyanurate, 4-hydroxymethyl-1-phospha-2,6,7-trioxabicyclo[2.2.2]-octane and combinations comprising at least one of the foregoing esters of beta-(5-tert-butyl-4-hydroxyl-3-methylphenyl)-propionic acid with monohydric or polyhydric alcohols may be utilized to increase paint adhesion in the compositions.

Esters of 3,5-di-tert-butyl-4-hydroxyphenylacetic acid with monohydric or polyhydric alcohols, such as for example, with methanol, ethanol, octadecanol, 1,6-hexandiol, 1,9-nonanediol, ethylene glycol, 1,2-propenediol, diethylene glycol, thio-diethylene glycol, neopentylglycol, pentaerythritol, 3-thia-undecanol, 3-thia-pentadecanol, trimethylhexanediol trimethylolethane, trimethylolpropane, tris-hydroxyethyl isocyanurate and 4-hydroxymethyl-1-phospha-2,6,7-trioxabicyclo[2.2.2]-octane, especially the tetrakis ester of pentaerythritol and combinations comprising at least one of the foregoing esters of 3,5-di-tert-butyl-4-hydroxyphenylacetic acid with monohydric or polyhydric alcohols may be utilized to increase paint adhesion in the compositions.

The phenolic antioxidant of particular interest is selected from the group consisting of n-octadecyl 3,5-di-tert-butyl-4-hydroxyhydrocinnamate, neopentanetetrayl tetrakis(3,5-di-tert-butyl-4-hydroxyhydrocinnamate), di-n-octadecyl 3,5-di-tert-butyl-4-hydroxybenzylphosphonate, 1,3,5-tris(3,5-di-tert-butyl-4-hydroxybenzyl)-isocyanurate, thiodiethylene bis(3,5-di-tert-butyl-4-hydroxyhydrocinnamate), 1,3,5-trimethyl-2,4,6-tris(3,5-di-tert-butyl-4-hydroxybenzyl) benzene, 3,6-dioxaoctamethylene bis(3-methyl-5-tert-butyl-4-hydroxyhydrocinnamate), 2,6-di-tert-butyl-p-cresol, 2,2'-ethylidene-bis(4,6-di-tert-butylphenol), 1,3,5-tris(2,6-dimethyl-4-tert-butyl-3-hydroxybenzyl)isocyanurate, 1,1,3-tris(2-methyl-4-hydroxy-5-tert-butylphenyl)butane, 1,3,5-tris[2-(3,5-di-tert-butyl-4-hydroxyhydrocinnamoyloxy) ethyl]isocyanurate, 3,5-di-(3,5-di-tert-butyl-4-hydroxybenzyl)mesitol, hexamethylene bis(3,5-di-tert-butyl-4-hyroxyhydrocinnamate), 1-(3,5-di-tert-butyl-4-hydroxyanilino)-3,5-di(octylthio)-s-triazine, N,N'-hexamethylene-bis(3,5-di-tert-butyl-4-hydroxyhydrocinnamamide), calcium bis(ethyl 3,5-di-tert-butyl-4-hydroxybenzylphosphonate), ethylene bis[3,3-di(3-tert-butyl-4-hydroxyphenyl)butyrate], octyl 3,5-di-tert-butyl-4-hydroxybenzylmercaptoacetate, bis(3,5-di-tert-butyl-4-hydroxyhydrocinnamoyl)hydrazide, N,N'-bis-[2-(3,5-di-tert-butyl-4-hydroxyhydrocinnamoyloxy)ethyl]-oxamide, and combinations comprising at least one of the foregoing phenolic antioxidants.

In one embodiment the phenolic antioxidant may be selected from the group consisting of neopentanetetrayl tetrakis(3,5-di-tert-butyl-4-hydroxyhydrocinnamate), n-octadecyl 3,5-di-tert-butyl-4-hydroxyhydrocinnamate, 1,3,5-trimethyl-2,4,6-tris(3,5-di-tert-butyl-4-hydroxybenzyl)benzene, 1,3,5-tris(3,5-di-tert-butyl-4-hydroxybenzyl)isocyanurate, 2,6-di-tert-butyl-p-cresol, 2,2'-ethylidene-bis(4,6-di-tert-butylphenol) and combinations comprising at least one of the foregoing phenolic antioxidants. The most preferred phenolic antioxidant is pentaerythritol tris ester with 3-(3,5-di-tert-butyl-4-hydroxyphenyl)propionic acid.

When the present compositions contain a 3-arylbenzofuranone, the 3-arylbenzofuranone is of the formula

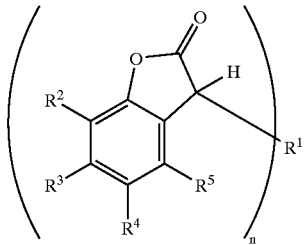

wherein, when n is 1, $R^1$ is an unsubstituted or substituted carbocyclic or heterocyclic aromatic ring system, wherein, when n is 2, $R^1$ may be unsubstituted or if substituted is a $C_1$–$C_4$ alkyl- or hydroxy-substituted phenylene or naphthylene; or is —$R^6$—X—$R^7$—, and wherein $R^2$, $R^3$, $R^4$ and $R^5$ are each independently of one another hydrogen, chloro, hydroxy, $C_1$–$C_{25}$ alkyl, $C_7$–$C_9$ phenylalkyl, unsubstituted or $C_1$–$C_4$ alkyl-substituted phenyl, unsubstituted or $C_1$–$C_4$ alkyl-substituted $C_5$–$C_8$ cycloalkyl; $C_1$–$C_{18}$ alkoxy, $C_1$–$C_{18}$ alkylthio, $C_1$–$C_4$ alkylamino, di-($C_1$–$C_4$ alkyl)amino, $C_1$–$C_{25}$ alkanoyloxy, $C_1$–$C_{25}$ alkanoylamino, $C_3$–$C_{25}$ alkenoyloxy, $C_3$–$C_{25}$ alkanoyloxy which is interrupted by oxygen, sulfur or >N—$R^8$; $C_6$–$C_9$ cycloalkylcarbonyloxy, benzoyloxy or $C_1$–$C_{12}$ alkyl-substituted benzoyloxy; or each pair of substituents $R^2$ and $R^3$ or $R^3$ and $R^4$ or $R^4$ and $R^5$, together with the linking carbon atoms, forms a benzene ring; $R^4$ is additionally —$(CH_2)_p$—$COR^9$ or —$(CH_2)_q$OH, or, if $R^3$ and $R^5$ are hydrogen, $R^4$ is additionally a radical of formula

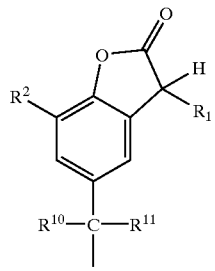

wherein R¹ is as defined above when n=1, R⁶ and R⁷ are each independently of the other unsubstituted or $C_1$–$C_4$ alkyl-substituted phenylene or naphthylene, R⁸ is hydrogen or $C_1$–$C_8$ alkyl, R⁹ is hydroxy,
(—$O^{-1}/r$ $M^{r+}$);
$C_1$–$C_{18}$ alkoxy or

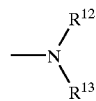

R¹⁰ and R¹¹ are each independently of the other hydrogen, $CF_3$, $C_1$–$C_{12}$ alkyl or phenyl, or R¹⁰ and R¹¹, together with the linking carbon atom, form a $C_5$–$C_8$ cycloalkylidene ring which is unsubstituted or substituted by 1 to 3 $C_1$–$C_4$ alkyl groups, R¹⁴ is hydrogen or $C_1$–$C_{18}$ alkyl, M is a metal cation of valency r, X is a direct bond, oxygen, sulfur or NR¹⁴, n is 1 or 2, p is 0, 1 or 2, q is 1, 2, 3, 4, 5 or 6, and r is 1, 2 or 3, which process comprises reacting a compound of formula

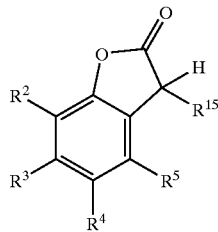

wherein R¹⁵ is halogen or —OR'¹⁵, R'¹⁵ is hydrogen, $C_1$–$C_{25}$ alkanoyl, $C_3$–$C_{25}$ alkenoyl, $C_3$–$C_{25}$ alkanoyl which is interrupted by oxygen, sulfur or

$C_6$–$C_9$ cycloalkylcarbonyl, thenoyl, furoyl, benzoyl or $C_1$–$C_{12}$ alkyl-substituted benzoyl; naphthoyl or $C_1$–$C_{12}$ alkyl-substituted naphthoyl; $C_1$–$C_{25}$ alkanesulfonyl, fluorosubstituted $C_1$–$C_{25}$ alkanesulfonyl; phenylsulfonyl or $C_1$–$C_{12}$ alkyl-substituted phenylsulfonyl;

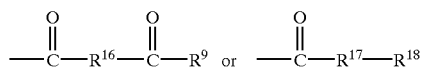

R¹⁶ is a direct bond, $C_1$–$C_{18}$ alkylene, $C_2$–$C_{18}$ alkylene which is interrupted by oxygen, sulfur or

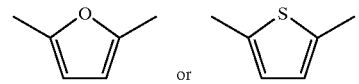

$C_2$–$C_{18}$ alkenylene, $C_2$–$C_{20}$ alkylidene, $C_7$–$C_{20}$ phenylalkylidene, $C_5$–$C_8$ cycloalkylene, $C_7$–$C_8$ bicycloalkylene, unsubstituted or $C_1$–$C_4$ alkyl-substituted phenylene,

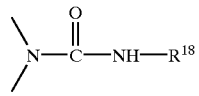

R¹⁷ is oxygen, —NH— or and
R¹⁸ is $C_1$–$C_{18}$ alkyl or phenyl, with a compound of formula $[H]_n$—R¹.

Useful 3-arylbenzofuranones are known compounds and include those found in U.S. Pat. Nos. 4,325,863; 4,338,244, 5,175,312, and 5,607,624.

An especially preferred 3-arylbenzofuranone is 5,7-di-tert-butyl-3-(3,4-di-methylphenyl)-3H-benzofuran-2-one.

When the compositions contain a thiosynergist, such thiosynergists may be for example dilauryl thiodipropionate, distearyl thiodipropionate or neopentanetetrayl tetrakis(3-dodecylthiopropionate). Distearyl thiodipropionate, dilauryl thiodipropionate, and pentaerythritol betalaurylthiopropionate is particularly preferred.

When the compositions contain an alkaline metal salt of a fatty acid, such salts may be alkali metal, alkaline earth metal, zinc, cadmium or aluminum salts of higher fatty acids such as, for example, calcium stearate, zinc stearate, magnesium behenate, sodium ricinoleate, or potassium palmitate. Calcium stearate is particularly preferred.

When the compositions contain a hindered amine stabilizer, such hindered amines may, for example, be 4-benzoyl-2,2,6,6-tetramethylpiperidine, 4-stearyloxy-2,2-6,6-tetramethylpiperidine, bis-(2,2,6,6-tetramethylpiperidyl)sebacate, or 3-n-octyl-7,7,9,9-tetramethyl-1,3,-8-triaza-spiro[4.5]decane-2,4-dione. Amine oxides of hindered amine stabilizers may also be utilized in the compositions.

The hindered amine stabilizers of particular interest are selected from the group consisting of bis(2,2,-6,6-tetramethylpiperidin4-yl)sebacate, bis(1,2,2,6,6-pentamethylpiperidin-4-yl)sebacate, di(1,2,2,6,6-pentamethylpiperidin-4-yl)(3,5-di-tert-butyl-4-hydroxybenzyl)-butylmalonate, tris(2,2,6,6-tetramethylpiperidin4-yl)nitrilotriacetate, 1,2-bis(2,2,6,6-tetramethyl-3-oxopiperazin-4-yl)ethane, 2,2,4,4-tetramethyl-7-oxa-3,20-diaza-21-oxodispiro[5.1.11.2] heneicosane, polycondensation product of 2,4-dichloro-6-tert-octylamino-s-triazine and 4,4'-hexamethylenebis(amino-2,2,6,6-tetramethylpiperidine), polycondensation product of 1-(2-hydroxyethyl)-2,2,6,6-tetramethyl-4-hydroxypiperidine and succinic acid, polycondensation product of 4,4'-hexamethylenebis(amino-2,2,6-6-tetramethylpiperidine) and 1,2-dibromoethane, polycondensation product of 2,4-dichloro-6-morpholino-s-triazine and 4,4'-hexamethylenebis(amino-2,2,6,6-tetramethylpiperidine), N,N'N'',N'''-tetrakis[(4,6-bis(butyl-(2,2,6,6-tetramethylpiperidin4-yl)-amino-s-triazin-2-yl]-1,10-diamino-4,7-diazadecane, octamethylene bis(2,2,6,6-tetramethylpiperidin-4-carboxylate), and 4,4'-ethylenebis-(2,2,6,6-tetramethylpiperazin-3-one).

In another embodiment the hindered amine stabilizer is selected from the group consisting of bis(2,2,6,6-tetramethylpiperidin-4-yl)sebacate, the polycondensation product of 1-(2-hydroxyethyl)-2,2,6,6-tetramethyl-4-hydroxypiperidine and succinic acid, the polycondensation product of 2,4-dichloro-6-tert-octylamino-s-triazine and 4,4'-hexamethylenebis(amino-2,2-6,6-tetramethylpiperidine), N,N',N'',N'''-tetrakis[(4,6-bis(butyl-(2,2,6,6-tetramethyl-piperidin-4-yl)amino)-s-triazine-2-yl]-1,10-diamino-4,7-diazadecane, and combinations comprising at least one of the foregoing hindered amine stabilizers.

When the compositions contain an ultraviolet light absorber, such light absorbers may include the 2H-benzotriazoles, the benzophenones, the oxanilides, the alpha-cyanocinnamates the substituted benzoate esters or the nickel salts of the O-alkyl hindered phenolic benzylphosphonates.

Examples of such ultraviolet light absorbers are seen below.

2-(2'-Hydroxyphenyl)-benzotriazoles, e.g., the 5'-methyl-, 3',5'-di-tert-butyl-, 5'-tert-butyl-, 5'-(1,1,3,3-tetramethylbutyl)-, 5-chloro-3',5'-di-tert-butyl-5-chloro-3'-tert-butyl-5'-methyl-, 3'-sec-butyl-5'-tert-butyl-, 3'-alpha-methylbenzyl-5'-methyl, 3'-alpha-methylbenzyl-5'-methyl-5-chloro-, 4'-hydroxy-, 4'-methoxy-, 4'-octoxy-, 3',5'-di-tert-amyl-, 3'-methyl-5'-carbomethoxyethyl- and 5-chloro-3',5'-di-tert-amyl-derivative.

2,4-bis-(2'-Hydroxyphenyl)-6-alkyl-s-triazines, e.g., the 6-ethyl-, 6-heptadecyl- or 6-undecyl-derivative.

2-Hydroxybenzophenones e.g., the 4-hydroxy-, 4-methoxy-, 4-octoxy-, 4-decyloxy-, 4-dodecyloxy-, 4-benzyloxy-, 4,2',4'-trihydroxy-, 2,2',4,4'-tetrahydroxy-or 2'-hydroxy-4,4'-dimethoxy-derivative.

1,3-bis-(2'-Hydroxybenzoyl)-benzenes, e.g., 1,3-bis-(2'-hydroxy-4'-hexyloxy-benzoyl)-benzene, 1,3-bis-(2'-hydroxy-4'-octyloxy-benzoyl)-benzene or 1,3-bis-(2'-hydroxy4'-dodecyloxybenzoyl)-benzene.

Esters of optionally substituted benzoic acids, e.g., phenylsalicylate octylphenylsalicylate, dibenzoylresorcin, bis-(4-tert-butylbenzoyl)-resorcin, benzoylresorcin, 3,5-di-tert-butyl-4-hydroxybenzoic acid-2,4-di-tert-butylphenyl ester or -octadecyl ester or -2-methyl-4,6-di-tert-butyl ester.

Acrylates, e.g., alpha-cyano-beta, beta-diphenylacrylic acid ethyl ester or isooctyl ester, alpha-carbomethoxy-cinnamic acid methyl ester, alpha-cyano-beta-methyl-p-methoxy-cinnamic acid methyl ester or -butyl ester, or N(beta-carbomethoxyvinyl)-2-methyl-indoline.

Oxalic acid diamides, e.g., 4,4'-di-octyloxy-oxanilide, 2,2'-di-octyloxy-5,5'-di-tert-butyl-oxanilide, 2,2'-di-dodecyloxy-5,5-di-tert-butyl-oxanilide, 2-ethoxy-2'-ethyl-oxanilide, N,N'-bis-(3-dimethyl-aminopropyl)-oxalamide, 2-ethoxy-5-tert-butyl-2'-ethyloxanilide and the mixture thereof with 2-ethoxy-2'-ethyl-5,4'-di-tert-butyl-oxanilide, or mixtures of o- and p-methoxy- as well as of o- and p-ethoxy-disubstituted oxanilides.

Preferably the ultraviolet light absorber used in the compositions are 2-(2-hydroxy-5-methylphenyl)-2H-benzotriazole, 2-(2-hydroxy-3,5-di-tert-amylphenyl)-2H-benzotriazole, 2-[2-hydroxy-3,5-di-(alpha,alpha-dimethylbenzyl)phenyl]-2H-benzotriazole, 2-(2-hydroxy-5-tert-octylphenyl)-2H-benzotriazole, 2-hydroxy-4-octyloxybenzophenone, nickel bis(O-ethyl 3,5-di-tert-butyl-4-hydroxybenzylphosphonate), 2,4-dihydroxybenzophenone, 2-(2-hydroxy-3-tert-butyl-5-methylphenyl)-2H-benzotriazole, nickel butylamine complex with 2,2'-thiobis(4-tert-butylphenol), 2-ethoxy-2'-ethyloxanilide or 2-ethoxy-2'-ethyl-5,5'-ditert-butyloxanilide.

When the instant compositions contain a hydroxylamine, such hydroxylamines may include, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl N-octadecylhydroxylamine, N-heptadecyl N-octadecylhydroxylamine, N,N-dioctylhydroxylamine, N,N-di-tert-butylhydroxylamine, N-cyclohexylhydroxylamine, N-cyclododecylhydroxylamine, N,N-dicyclohexylhydroxylamine, N,N-dibenzylhydroxylamine, N,N-didecylhydroxylamine, N,N-di(coco alkyl) hydroxylamine, N,N-di($C_{20}$–$C_{22}$ alkyl)hydroxylamine, and N,N-dialkylhydroxylamine derived from hydrogenated tallow amine (i.e., N,N-di(tallow alkyl)hydroxylamine), as well as combinations comprising at least one of the foregoing UV light stabilizers.

It is generally desirable for the antioxidants and stabilizers to be present in the composition in an amount of greater than about 0.4, preferably about 0.5 to about 0.7 parts by weight per hundred parts by weight per hundred per hundred parts by weight of the total composition (phr). Within this range it is generally desirable for the antioxidant or stabilizer to be present in an amount of greater than or equal to about 0.52, preferably greater than or equal to about 0.54 phr, based upon the weight of the total composition. It is also generally desirable to have the antioxidant or the stabilizers to be present in an amount of less than or equal to about 0.68, preferably less than or equal to about 0.66 phr, based on the weight of the total composition.

The antioxidants and stabilizers generally stabilize the composition during high temperature bake cycles or annealing cycles employed during the electrostatic coating process. During the electrostatic coating process, the composition or articles derived from the composition are annealed at temperatures greater than or equal to about 165° C. for time periods greater than or equal to about 10 minutes. It is generally desirable for the composition to be stable and to withstand annealing temperatures greater than or equal to about 205° C., preferably greater than or equal to about 220° C. for time periods greater than or equal to about 20 minutes, preferably greater than or equal to about 40 minutes.

The antioxidants and stabilizers may readily be incorporated into the composition by techniques such as, for example, extrusion, kneading, roll milling, at any convenient stage prior to the manufacture of shaped articles therefrom. For example, the antioxidants and/or stabilizer may be mixed with the polymer in dry powder form, or a suspension or emulsion of the antioxidant and/or stabilizer may be mixed with a solution, suspension, or emulsion of the polymer. The following may be mentioned as examples of further additives that can be used in the compositions.

Metal deactivators, e.g., oxanilide, isophthalic acid dihydrazide, sebacic acid-bis-phenylhydrazide, bis-benzylideneoxalic acid dihydrazide, N,N'-diacetal-adipic acid dihydrazide, N,N'-bis-salicyloyl-oxalic acid dihydrazide, N,N'-bis-salicyloylhydrazine, N,N'-bis-(3,5-ditert-butyl-4-hydroxyphenylpropionyl)-hydrazine, N-salicyloyl N'-salicylalhydrazine, 3-salicyloyl-amino-1,2, 4-triazole or N,N'-bis-salicyloyl-thiopropionic acid dihydrazide.

Nucleation agents, e.g., 4-tert-butylhenzoic acid, adipic acid, diphenylacetic acid or substituted sorbitols such as 1,3; 2,4-dibenzylidenesorbitol.

Other optional additives that can be incorporated in the compositions are antiblocking agents, clarifiers, antiozonants, lubricants such as stearyl alcohol, fillers, carbon black, asbestos, colorants or dyes, kaolin, talc, glass fibers, pigments, optical brighteners, flameproofing agents and antistatic agents. These optional additives can be present in amounts of about 0.01 to about 5%, preferably from about 0.025 to about 2%, and especially from about 0.1% to about 1%, by weight of various conventional additives, such as the following, or mixtures thereof.

The compatibilized composition of polyphenylene ether and polyamide additionally contains various impact modifiers for improving the impact resistance. Useful elastomers for this purpose are known in the art and include, for example, styrenic block copolymers and various acid functionalized ethylene-propylene copolymers (e.g., EP-graft-maleic anhydride). Especially preferred are the elastomeric block copolymers, for example, A-B-A triblock copolymers and A-B diblock copolymers. The A-B and A-B-A type block copolymer rubber additives, which may be used are thermoplastic rubbers comprised of one or two alkenyl aromatic blocks which are generally styrene blocks and a rubber block, e.g., a butadiene block, which may be partially or totally hydrogenated. Mixtures of these triblock copolymers and diblock copolymers having hydrogenated rubber blocks are especially preferred in the present compositions.

Suitable A-B and A-B-A type block copolymers are disclosed in, for example, U.S. Pat. Nos. 3,078,254, 3,402, 159, 3,297,793, 3,265,765, and 3,594,452 and U.K. Patent 1,264,741. Examples of typical species of A-B and A-B-A block copolymers include polystyrene-polybutadiene (SBR), polystyrene-poly(ethylene-propylene), polystyrene-polyisoprene, poly($\alpha$-methylstyrene)-polybutadiene, polystyrene-polybutadiene-polystyrene (SBR), polystyrene-poly(ethylene-butylene)-polystyrene (SEBS), polystyrene-polyisoprene-polystyrene and poly($\alpha$-methylstyrene)-polybutadiene-poly($\alpha$-methylstyrene), as well as the selectively hydrogenated versions thereof. Preferred impact modifiers are combinations of polystyrene-poly(ethylene-butylene)-polystyrene and polystyrene-poly(ethylene-propylene) (SEP) copolymers.

Such A-B and A-B-A block copolymers are available commercially from a number of sources, including Phillips Petroleum under the trademark SOLPRENE, Shell Chemical Co., under the trademark KRATON, Dexco under the tradename VECTOR, and Kuraray under the trademark SEPTON. Other useful elastomers include functionalized elastomeric polyolefins containing at least one moiety selected of the group consisting of anhydride, epoxy, oxazoline, orthoester and combinations comprising at least one of the foregoing. The structural units of the elastomeric polyolefin are derived from ethylene and at least one $C_{3-8}$ olefin, such as, propylene, 1-butene, 1-hexene, and 1-octene.

A useful amount of the optional elastomeric block copolymers is about 1% to about 20% by weight, preferably about 6% to about 15% by weight, wherein the weight percentages are based on the total weight of the composition.

The composition preferably contains at least one conductive additive. The conductive additive is preferably selected from the group consisting of conductive carbon black, conductive carbon fibrils having diameters of 3.5–500 nanometers, carbon nanotubes, and combinations comprising at least one of the foregoing conductive additives. Conductive additives having particle or individual fiber diameters greater than about 500 nanometers are generally not preferred, as they do not provide the smooth Class A finish desired for automotive body panels. The conductive additive can be added directly into the compatibilized composition during the melt processing step or preferably pre-dispersed into either the polyphenylene ether or the polyamide. It is preferable to pre-disperse the conductive additive into the polyamide phase so as to make a concentrate of the conductive additive in the polyamide. It is generally preferred for the conductive additive to reside primarily with the polyamide phase as greater conductivity is generally achieved with a smaller amount of the conductive additive. It may also be desirable to use more than one conductive additive concentrate in the preparation of the composition.

The electrically conductive carbon black incorporated into the polymer composition preferably has an average particle size of about 10 to about 50 nanometers and a pH of about 6.5 to about 10, wherein the percent volatile ingredients in the carbon black are preferably less than about 2 wt %, and more preferably less than about 1.5 wt % and most preferably less than about 0.2 wt %. Preferably, the pore volume of the carbon black is about 150 to about 500 $cm^3/100$ grams. Exemplary electrically conductive carbon blacks are Ketjenblacks EC-300J or EC-600J commercially available from AKZO Chemicals, and CONDUCTEX 975U and CONDUCTEX SC commercially available from Columbian Chemicals Company, and PRINTEX XE 2 commercially available from Degussa Corporation.

Useful carbon fibrils include these having diameters between about 3.5 and 500 nanometers such as those obtained from Hyperion Catalyst Company. Carbon fibrils are also commonly called multi-wall carbon nanotubes. In addition to the multi-wall nanotubes, single wall carbon nanotubes may also be used in the conductive polyether-polyamide compositions. Useful carbon nanotubes are those having diameters of about 0.7 to about 500 nanometers. Carbon nanotubes may be manufactured by chemical vapor deposition processes, carbon arc based processes or laser ablation processes. Nanotubes obtained from the chemical vapor deposition processes are generally termed vapor grown carbon fibers and these are generally multi-walled nanotubes, whereas those developed from the carbon arc based processes and laser ablation processes are generally single wall nanotubes. Both single wall and multiwall nanotubes may be used in the compositions.

The amount of conductive material added is preferably an amount that will result in the composition having a specific volume resistivity below $1 \times 10^5$ Ohm-cm, preferably below $9 \times 10^4$ Ohm-cm, and having a surface resistance above $1 \times 10^5$ Ohm, preferably above $1 \times 10^6$ Ohm. More preferably, the composition has a specific volume resistivity below $4 \times 10^5$ Ohm-cm and has a surface resistance above $3.5 \times 10^5$ Ohm. When the specific volume resistivity is below $10^4$ Ohm-cm, the resin composition is sufficiently conductive to allow to electrostatic painting. Conversely, when the surface resistance is above $10^5$ Ohm, the resin composition is not so conductive as to have electro-deposition of the corrosion inhibitor onto the plastic ingredient, an undesirable affect. The amount of the conductive additive does vary depending on a number of factors such as the type of conductive additive and the ratio of polyphenylene ether to polyamide and the degree of dispersion of the conductive additive.

Conductive additives may generally be added in amounts of about 0.4% to about 6% by weight, preferably about 0.7% to about 4% by weight, based on the total weight of the composition. If conductive carbon black powder is used as the conductive additive, it is generally present in an amount of about 0.8 to about 10 percent by weight, preferably about 1% to about 5% by weight, based on the total weight of the composition. If carbon nanotubes are used as the conductive additives, they are generally present in an amount of about 0.5% to about 5% by weight, preferably about 0.7% to about 2.0% by weight, based on the total weight of the composition.

The preparation of the compositions is generally achieved by melt blending the ingredients under conditions favorable for the formation of an intimate composition. Such conditions often include mixing in single or twin screw type extruders, roll mills, buss kneaders, or similar mixing devices that can apply a shear to the ingredients.

All of the ingredients may be added initially to the processing system, or else certain additives may be pre-compounded with one or more of the primary ingredients, preferably the polyphenylene ether, the impact modifiers, and/or the polyamide. The ingredients may be added simultaneously or sequentially. It appears that certain properties, such as impact strength and elongation, are sometimes enhanced by initially precompounding the polyphenylene ether, impact modifiers, optionally with any other ingredients, prior to compounding with the polyamide, however, these improvements are done at the expense of increasing the viscosity of the compatibilized composition. While separate extruders may be used in the processing, these compositions are preferably prepared by using a single extruder having multiple feed ports along its length to accommodate the addition of the various ingredients. It is often advantageous to apply a vacuum to the melt through at least one or more vent ports in the extruder to remove volatile impurities in the composition. Those of ordinary skill in the art will be able to adjust compounding times and temperatures, as well as ingredient addition, without undue additional experimentation.

The following examples, which are meant to be exemplary, not limiting, illustrate compositions and methods of manufacturing some of the various embodiments of the polyphenylene ether polyamide compositions using various materials and apparatus.

EXAMPLES

A. Blend Formulation

The base composition used in Table 1 contained the following components as parts by weight wherein the total blend formulation by parts by weight is 99.70 phr. All parts are parts by weight per hundred parts resin (phr).

38.44 PPE (poly(2,6-dimethylphenylene ether) having an intrinsic viscosity of about 0.40 as measured in chloroform at 30° C.)
44 nylon 6,6
7 Kraton G1651 (S-EB-S triblock copolymer)
3.5 Kraton G1701X (S-EP diblock copolymer)
0.65 citric acid
0.10 KI added as an aqueous solution
0.01 CuI
6.0 carbon fibril master batch (20 weight % fibril having a diameter between about 10 to 30 nanometers+80 weight % nylon 6,6) as the basic matrix formulation.

The illustrative stabilizers used in Table 1 are as follows:
Irganox 1010: Pentaerythritol tris ester with 3-(3,5-di-tert-butyl-4-hydroxyphenyl)propionic acid, chemical abstract service number [84633-54-5]
Seenox 412S: Pentaerythritol betalaurylthiopropionate, chemical abstract service number [29598-76-3]

B. Extrusion (Compounding)

Blend formulations were compounded using a WP 53 mm TSE using temperature profile of 400-500-600-600-600-600-600-600-600-600-550° F. (Zone1-10 plus die), 300 rpm @ 220 lbs/hr run rate.

C. Molding

Molding plaques used for paint adhesion study was 4 in.×12 in.×⅛ in. molded using a Toshiba ISE310 injection molding machine (press) at a set barrel temperature of 298° C. (570° F.) and a tool temperature of (77° C.) 170° F.

D. Paint Adhesion Test

The paint adhesion test method and the evaluation criteria used were specifically developed by GE Plastic Coating Laboratory in Louisville, Ky.

D1. Sample Preparation

Three replicate 4 in.×12 in.×⅛ in. plaques of each material are wiped with isopropyl alcohol and dried with lint free cheesecloth to provide a clean surface. Panels are baked by a gas oven at 204° C. (400° F.) for 40 minutes to simulate a typical e-coat production heat history. Primer/surfacer (PPG-FCP 6534-Titanium Frost polyester/urethane, 67% solids primer/surfacer before reduction) is reduced (or diluted) per the paint manufacturer's instructions and applied to the plaques with a Spraymation precision applicator. Applicator is adjusted to deposit 1.2 to 1.4 mils dry film thickness in two (2) passes of atomized paint spray. Painted plaques are baked for thirty (30) minutes at 160° C. (320° F.) per manufacturer's guidelines to cure the primer/surfacer. Cooled plaques are tested for peel adhesion at the top, bottom and middle of each of the three (3) plaques for a total of nine (9) data points per material. A control material with known acceptable performance is always included as a verification point in each study.

D2. Paint Adhesion Test

A ½-inch square of primer/surfacer wiped with isopropyl alcohol to remove dust and oils. One drop of adhesive (Elmer's Wonderbond Plus, manufactured by Borden Chemical, Inc.) is applied to the target area, and one end of a prepared polycarbonate film strip applied with firm pressure. After the adhesive has cured according to its manufacturer's recommendations, a force gauge is clamped to the free end of the polycarbonate strip. The force gauge, calibrated and verified to at least ±0.4 foot-pounds, is pulled by hand at a constant angle until the strip is detached. The value on the force gauge is recorded as Relative Bond Strength (RBS) in unit of ft-lb/0.5 inch, and the failure method evaluated.

D3. Pass/Fail Criteria

The primary constraint for evaluating paint adhesion is a qualitative comparison to a material with known adhesion performance at multiple customers. Quantitative evaluation is limited, but historical data demonstrates that a force of two (2) ft·lb/0.5 inch is recommended and a force of three (3) ft·lb/0.5 inch is desired. This Relative Bond Strength (RBS) has historically been adequate in screening materials that will pass automotive OEM paint adhesion standards. If RBS is below the 3 ft·lb/½-inch, a cohesive failure mode (breakage within the primer/surfacer or the polymer) is preferable to adhesive failure mode (primer/surfacer cleanly removed from the polymer surface).

Results:
Table 1 summarizes a series of experiments illustrating an embodiment of the invention of this disclosure. The conductive formulation 467-8 is typical for exterior body panel applications for online painting capability due to overall balance of its conductivity, high heat resistance and other physical property profile. However, it may not be appropriate for some automotive manufacturers due to its low performance in paint adhesion as judged by Relative Bond Strength (RBS) and the failure mode after peeling test. Samples 467-9, -5, -4, -6, and -1 are five different blends adding with various type and/or loading of anti-oxidant packages to resolve those shortcomings seen in the control blend. No appreciable improvement is noted at 0.3 phr of Irganox 1010 or Seenox 412S but a large, unexpected improvement is seen at 0.6 phr of Irganox 1010 or Seenox 412S and their combination at 0.3 phr/0.3 phr.

TABLE 1

| | Examples | | | | | |
|---|---|---|---|---|---|---|
| Sample ID | Control (467-8) | 467-9 | 467-5 | 467-4 | 467-6 | 467-1 |
| Irganox 1010 (phr) | 0 | 0 | 0 | 0.3 | 0.6 | 0.3 |
| Seenox 412S (phr) | 0 | 0.3 | 0.6 | 0 | 0 | 0.3 |
| Plaque 1- | 1.5 | 2.4 | 6.2 | 1.0 | 7.3 | 6.9 |
| Plaque 1- | 1.8 | 1.5 | 0.9 | 0.9 | 7.0 | 5.7 |
| Plaque 1- | 1.4 | 4.1 | 8.5 | 4.7 | 8.8 | 4.6 |
| Plaque 2- | 1.8 | 0.8 | 7.4 | 0.9 | 7.6 | 8.0 |
| Plaque 2- | 0.8 | 0.9 | 7.7 | 1.0 | 8.4 | 7.3 |
| Plaque 2- | 2.2 | 0.8 | 7.8 | 2.7 | 7.3 | 7.0 |
| Plaque 3- | 7.1 | 1.1 | 7.1 | 2.5 | 4.5 | 6.9 |
| Plaque 3- | 2.1 | 2.5 | 1.5 | 1.8 | 6.8 | 8.1 |
| Plaque 3- | 4.9 | 1.7 | 5.8 | 4.4 | 4.8 | 7.1 |
| Relative Bond Strength (ft-lb/0.5 inch) (Mean) | 2.6 | 1.8 | 5.9 | 2.2 | 6.9 | 6.8 |
| Relative Bond Strength (ft-lb/0.5 inch) (Std. dev.) | 2.0 | 1.1 | 2.8 | 1.5 | 1.5 | 1.1 |
| Failure Mode After | A | A | C | A | C | C |
| Vicat Softening Temp (° F.) | 394.5 | 386.6 | 383.3 | 388.3 | 388.6 | 380.1 |

A = Adhesive Failure
C = Cohesive Failure
Std. Dev. = standard deviation

Figure 2:
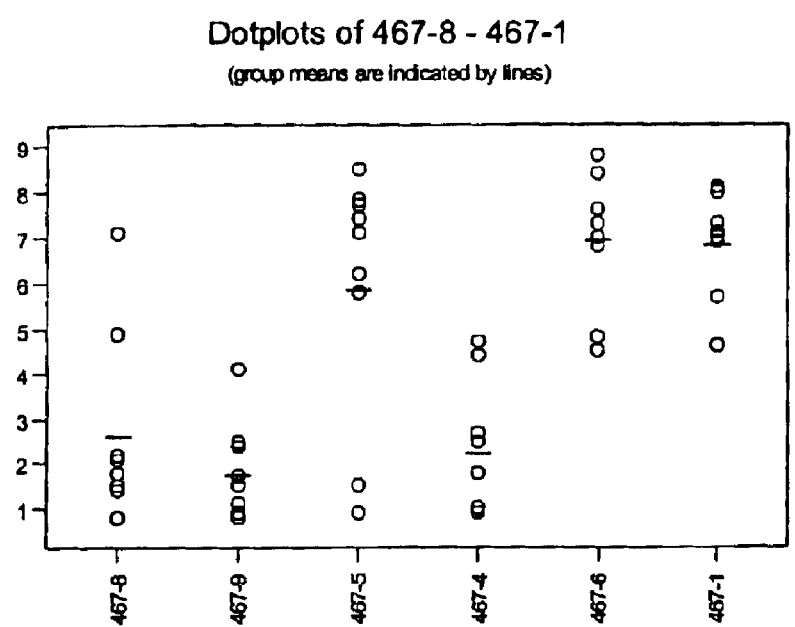
FIG. 2 is a dotplot of the relative bond strengths of painted molded articles made from the compositions in Table 1.

The RBS data plotted in FIGS. 1 and 2 demonstrate that 0.6 phr Irganox 1010 and 0.3 phr I-1010/0.3 phr Seenox 412S are better than 0.6 phr Seenox 412S as judged by the mean value and standard deviation (or data distribution).

Figure 3:
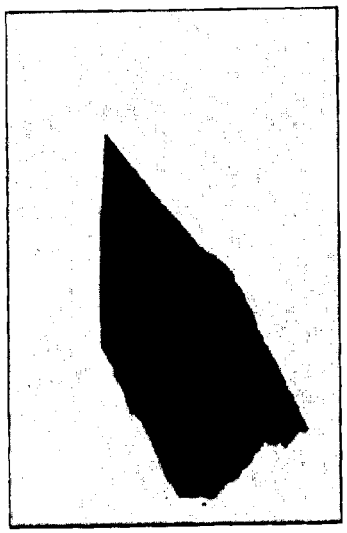
FIG. 3 depicts micrographs showing paint adhesion performance for the (a) control sample, (b) sample 1 and (c) sample 2 after being subjected to an impact test as detailed in Example 1.
Figure 3:
Figure 3:
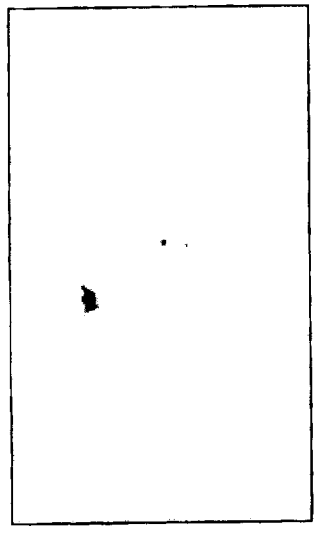

The adhesive failures may also be seen in FIGS. 3(a) and (b) for the 467-4 and the sample 467-9 respectively. In FIG. 3(a), the paint from the interface of the 467-4 has been stripped away and the failure takes place almost completely at the interface as witnessed by the dark area in the photomicrograph. In FIG. 3(b), which depicts the failure for sample 467-9, the failure is a combination of adhesive failure and cohesive failure. Since the failure however, appears to be mostly adhesive as witnessed by the larger cross-sectional area of the dark region, it has been classified as an adhesive failure. The addition of 0.6 phr of either Irganox 1010 or Seenox 412S or a combination of 0.3 phr of both antioxidants for a combined total of 0.6 phr of the antioxidants improves the RBS to above 5.5 ft-lb/0.5-inch and causes the failure to be cohesive. This can clearly be seen for samples 467-5, 467-6 and 467-1. A cohesive failure is generally indicative of good paint adhesion to the polyphenylene ether polyamide based article. This can be seen in FIG. 3(c), where the failure is cohesive. As can be seen in the figure, there is only a very small tear in the paint indicating that the addition of 0.6 phr of the antioxidant overcomes the paint adhesion problems seen in the control sample as well as samples 467-9 and 467-4.

Without being limited by theory, it is believed that the treatment of the plaques to a temperature of about 204° C. during the E-coating process promotes the degradation of the impact modifiers, which gives rise to the formation of a film on the surface of the plaque. This film causes the paint not to adhere to the plaque. The addition of 0.6 phr of antioxidant may reduce the degradation of the impact modifier and therefore may prevent the formation of a film on the surface of the polyphenylene ether-polyamide based article which in turn improves the paint adhesion as indicated by the improved RBS values in the Table 3 above and the change in the failure mechanism from adhesive to cohesive.

Heat resistance is another important physical property often necessary for online painting which determines the operation safety margin in high temperature online painting process (to prevent potential warpage or heat sag of plastic components). Addition of an antioxident (AO) generally lowers the heat resistance of control blend as judged by Vicat Softening temperature. Unexpectedly, blends containing Irganox 1010 exhibit the least deterioration (comparatively) vs counterparts containing Seenox 412S or Irganox 1010/Seenox 412S at same loading.

Example 2

In these examples, seven samples having the compositions shown in Table 2 below were extruded and injection molded using the conditions shown in Tables 3 and 4 respectively.

TABLE 2

| Composition (wt %) | 1 | 2 | 3 | 4 | 5 | 6 | 7 |
|---|---|---|---|---|---|---|---|
| PPO 803 | 34.39 | 34.09 | 33.94 | 33.79 | 33.64 | 33.49 | 33.79 |
| SEBS tribloc copolymer (KG1651) | 7 | 7 | 7 | 7 | 7 | 7 | 7 |
| SEP diblock copolymer (KG1701) | 8 | 8 | 8 | 8 | 8 | 8 | 8 |
| Citric Acid | 0.7 | 0.7 | 0.7 | 0.7 | 0.7 | 0.7 | 0.7 |
| Irganox 1010 | 0 | 0.3 | 0.45 | 0.6 | 0.75 | 0.9 | 0.6 |
| KI, 50% in H2O | 0.1 | 0.1 | 0.1 | 0.1 | 0.1 | 0.1 | 0.1 |
| CuI | 0.01 | 0.01 | 0.01 | 0.01 | 0.01 | 0.01 | 0.01 |
| Nylon 6,6 | 38 | 38 | 38 | 38 | 38 | 38 | 38 |
| Nylon 6 | 10 | 10 | 10 | 10 | 10 | 10 | 10 |
| Conductive Carbon Black | 1.8 | 1.8 | 1.8 | 1.8 | 1.8 | 1.8 | 1.8 |
| Formulation Total | 100 | 100 | 100 | 100 | 100 | 100 | 100 |

TABLE 3

| Zone # | Temperature(° C.) |
|---|---|
| Zone 1 | 50 |
| Zone 2 | 280 |
| Zone 3 | 300 |
| Zone 4 | 300 |
| Zone 5 | 300 |
| Zone 6 | 290 |
| Zone 7 | 300 |
| Zone 8 | 300 |
| Zone 9 | 300 |
| Zone 10 | 300 |
| Zone 11 | 300 |
| Zone 12 | 300 |
| Zone 13 | 310 |

TABLE 4

| Molding Parameters | Units | Entered value |
|---|---|---|
| Predry temp | (° C.) | 120 |
| Predry time | (hours) | 4 |

TABLE 4-continued

| Molding Parameters | Units | Entered value |
|---|---|---|
| T hopper | (° C.) | 60 |
| T zone 1 | (° C.) | 275 |
| T zone 2 | (° C.) | 280 |
| T zone 3 | (° C.) | 285 |
| T nozzle | (° C.) | 290 |
| T mold | (° C.) | 100 |
| Shot volume | (mm) | 52 |
| Decompression | (mm) | 2 |
| Switch point | (mm) | 10 |
| Injection Speed | (%) | 45 |
| Screw speed | (%) | 45 |
| Back pressure | (Bar) | 5 |
| Holding pressure | (%) | 30 |
| Holding time | (s) | 10 |
| Cooling time | (s) | 20 |
| Cushion | (mm) | N.A. |
| Injection pressure | (Bar) | N.A. |
| Injection time | (s) | N.A. |
| Cycle time | (s) | N.A. |

The injection molded plaques were baked in an oven at 204° C. for 30 minutes to generally simulate the E-coat production heat history. The first six samples were then powder painted on both sides and the paint was applied uniformly and evenly to all the compositions in a mass production type process. The samples were placed on a conveyor belt, wherein the conveyor speed was set at 7.5 feet/minute. Sample 7 which has the composition of sample 4, was not painted. All the samples (including sample 7) were post baked after painting for 35 minutes at a temperature of 204° C., following which they were subjected to testing.

The testing criteria utilized for evaluating the compositions is the HOR10007 paint specification standard in which paint adhesion is measured by a combination of impact tests and adhesion studies. The paint adhesion in all of the samples after the impact test is evaluated on both sides of the plaque i.e., the direct side impacted (D) as well as the reverse of the side impacted (R). Qualitative comparisons between the paint adhesion on the direct side impacted (D) as well as the reverse of the side impacted (R) may also be seen in Tables 5 and 6, which are described in detail below.

Table 5 reflects paint adhesion measurements made on the direct side impacted (D), and shows quite clearly that at 20, 40 and 80 inch-pounds (in-lbs) of impact force, there was no paint adhesion failure (PAF) for all of the samples. In general, an examination of the direct side reveals that there is no drastic paint adhesion failure due to subjecting the plaques to impact. However at 80 in-lbs of applied impact force, the paint generally begins to crack for all the samples. The cracking of the paint is not considered a paint adhesion failure. At 100 in-lbs of applied impact force, the plaques begin to fail catastrophically, i.e., the material of the plaque begins to crack.

Figure 4:
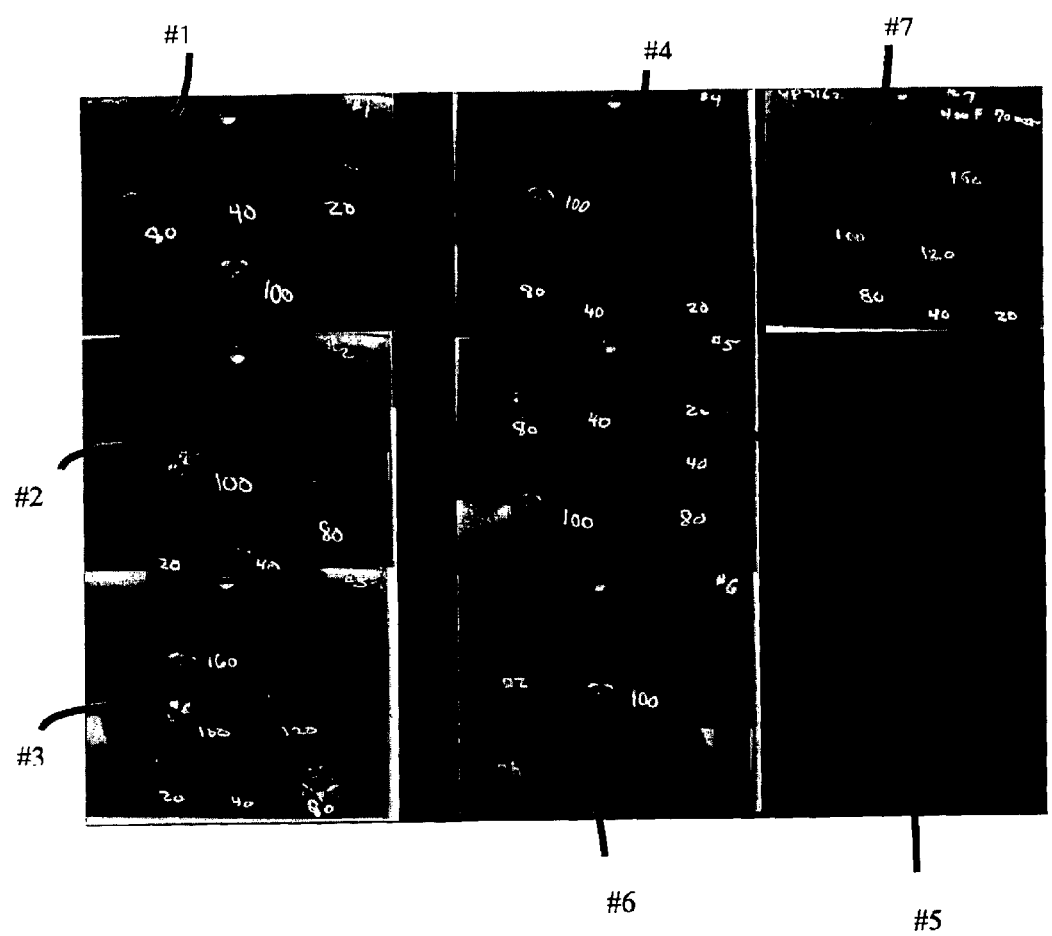
FIG. 4 depicts micrographs showing paint adhesion performance for samples 1–7 after being subjected to an impact test as detailed in Example 2.

Table 6 reflects paint adhesion measurements made on the reverse side of the impacted plaques (R). As may be seen from Table 6, the samples containing no anti-oxidant as well as those containing 0.30 wt % and 0.45 wt % antioxidant show paint adhesion failure at very low levels of impact. For example, the sample containing no antioxidant shows paint adhesion failure at 20 in-lbs of impact, while the sample containing 0.30 and 0.45 wt % anti-oxidant show paint adhesion failure at 40 in-lbs of impact. Samples containing 0.60 wt % and above, show no paint adhesion failure but instead generally show minor cracking in the paint as indicated by the designation of cracked paint (CP) assigned to these samples in the table. The paint adhesion on the reverse sides is shown in FIG. 4. As stated above, an examination of the reverse sides of samples 1, 2, and 3 in the figure shows quite clearly that the paint delaminated off of the reverse side of the impacted plaques, while samples 4, 5, and 6 show no such delamination.

Figure 5:
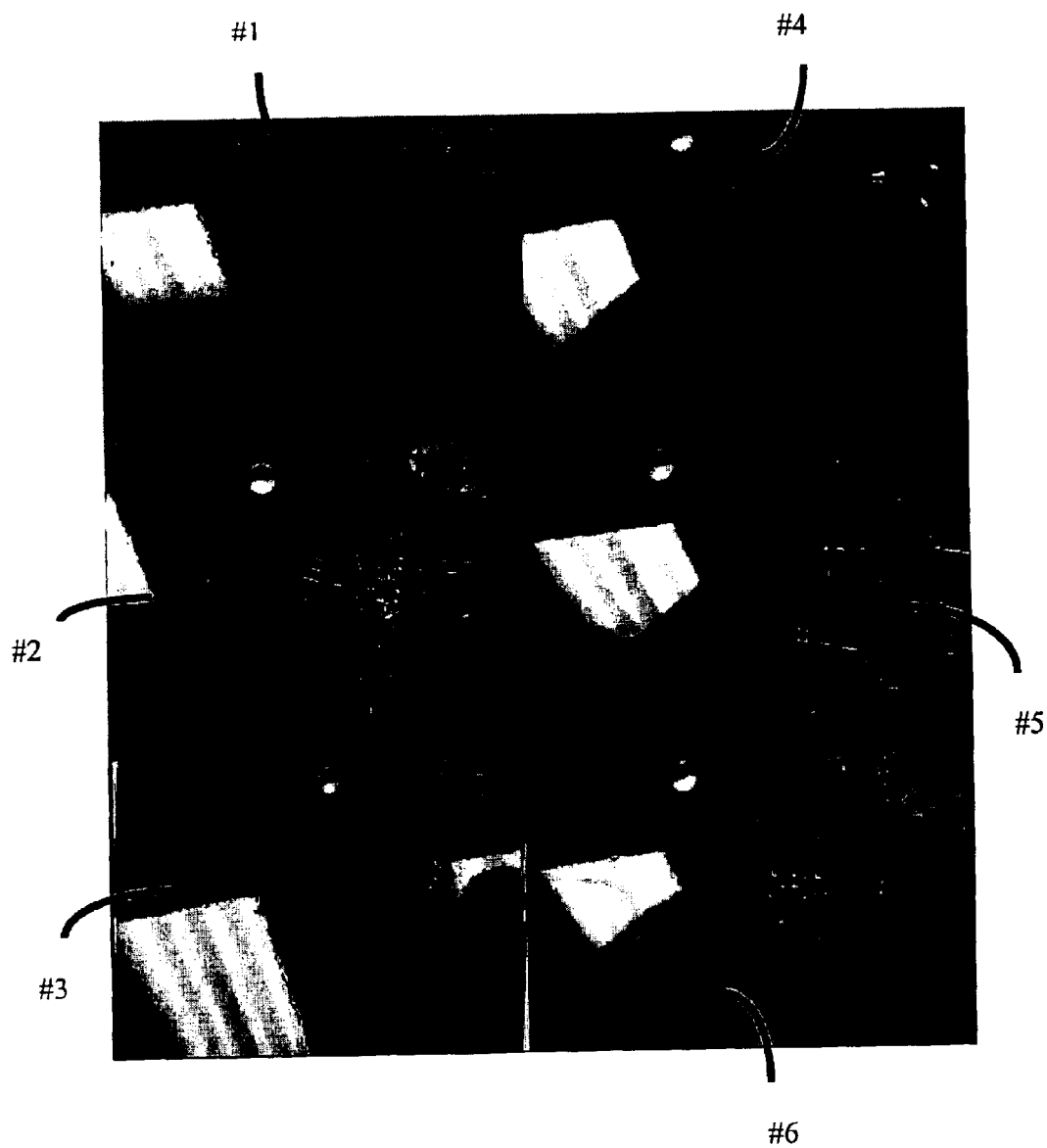
FIG. 5 depicts micrographs showing paint adhesions performance for samples 1–6 after being subjected to the scratch test as detailed in Example 2.

Table 7 reflects the results of the crosshatch adhesion test results. Results obtained from the ASTM D3359, ISO2409, DIN 53151 and JDQ17 tests, the procedures of which are incorporated by reference are also shown in Table 7. The crosshatch adhesion test is also commonly termed as a scratch test. In this test, the only samples, which displayed an acceptable level of paint adhesion, were samples 1 and 4. As may also be seen from the photomicrographs in FIG. 5, samples 1 and 4 show that no paint has peeled off the plaque after the scratch test, whereas samples 2, 3, 5 and 6 show varied amounts of paint that has peeled off from the plaque. This can also be seen in Table 7, where a crosshatch rating of greater than 4 indicates a passing grade in the test. A value of less than 4 is generally viewed as a failure.

Combining the results of the impact tests from tables 5 and 6 with the crosshatch adhesion test results in Table 7 shows that compositions having greater than about 0.45 phr of the antioxidant such as, for example, sample 4 displays suitable paint adhesion for use in automobile exterior body panels, which have been subjected to temperatures of about 204° C. in order to accomplish E-coat annealing. All the other samples in Tables 5, 6 or 7 show a failure in one of the tests and a failure to pass one of these tests prescribed by HOR 10007 is generally viewed as a failure of paint adhesion for an automotive exterior body panel.

TABLE 5

GARDNER IMPACT TESTING

| Sample Number | AO Loading (%) | Direction R-reverse D-Direct | 20 (in-lbs.) | 40 (in-lbs.) | 80 (in-lbs.) | 100 (in-lbs.) | 120 (in-lbs.) | 160 (in-lbs.) |
|---|---|---|---|---|---|---|---|---|
| 1 | 0.00 | D | Pass | Pass | Pass/CP | Fail/MC | N/T | N/T |
| 2 | 0.30 | D | Pass | Pass | Pass/CP | Fail/MC | N/T | N/T |
| 3 | 0.45 | D | Pass | Pass | Pass | Pass | Pass/CP | Fail/MC |
| 4 | 0.60 | D | Pass | Pass/CP | Pass/CP | Fail/MC | N/T | N/T |
| 5 | 0.75 | D | Pass | Pass | Pass/CP | Fail/MC | N/T | N/T |

TABLE 5-continued

GARDNER IMPACT TESTING

| Sample Number | AO Loading (%) | Direction R-reverse D-Direct | 20 (in-lbs.) | 40 (in-lbs.) | 80 (in-lbs.) | 100 (in-lbs.) | 120 (in-lbs.) | 160 (in-lbs.) |
|---|---|---|---|---|---|---|---|---|
| 6 | 0.90 | D | Pass | Pass | Pass/CP | Fail/MC | N/T | N/T |
| 7 | 0.60 | D | Pass | Pass | Pass | Pass | Pass | Pass |

N/T = No Test
CP = Cracked Paint
MC = Material Cracked

TABLE 6

GARDNER IMPACT TESTING

| Sample Number | AO Loading (%) | Direction R-reverse D-Direct | 20 (in-lbs.) | 40 (in-lbs.) | 80 (in-lbs.) | 100 (in-lbs.) | 120 (in-lbs.) | 160 (in-lbs.) |
|---|---|---|---|---|---|---|---|---|
| 1 | 0.00 | R | PAF | Pass/CP | Pass/CP | Fail/MC | N/T | N/T |
| 2 | 0.30 | R | Pass | PAF | PAF | PAF | N/T | N/T |
| 3 | 0.45 | R | Pass | PAF | PAF | PAF | PAF | PAF |
| 4 | 0.60 | R | Pass | Pass/CP | Pass/CP | Fail/MC | N/T | N/T |
| 5 | 0.75 | R | Pass | Pass/CP | Pass/CP | Fail/MC | N/T | N/T |
| 6 | 0.90 | R | Pass | Pass/CP | Pass/CP | Fail/MC | N/T | N/T |
| 7 | 0.60 | R | Pass | Pass | Pass | Pass | Pass | Pass |

N/T = No Test
CP = Cracked Paint
MC = Material Cracked
PAF = Paint Adhesion Failure

TABLE 7

CROSS HATCH ADHESION

| Sample Number | AO Leading (%) | X-Hatch Rating | Pass (4<) | ASTM D3359 | IOS 2409 | DIN 53151 | JDQ 17 |
|---|---|---|---|---|---|---|---|
| 1 | 0.00 | 5 | Pass | 5B | 0 | 0 | A |
| 2 | 0.30 | 2 | Fail | 2B | 3 | 3 | D |
| 3 | 0.45 | 0 | Fail | 0B | 5 | 5 | F |
| 4 | 0.60 | 5 | Pass | 5B | 0 | 0 | A |
| 5 | 0.75 | 1 | Fail | 1B | 4 | 4 | E |
| 6 | 0.90 | 3 | Fail | 3B | 2 | 2 | C |
| 7 | 0.60 | N/D | N/D | | | | |

N/T = No Test
CP = Cracked Paint
MC = Material Cracked
PAF = Paint Adhesion Failure In summary, when a polyphenylene ether polyamide composition using impact modifiers such as SEBS and SEPS is annealed to a temperature over 165° C. for a time period greater than or equal to about 10 minutes, it is generally desirable to add antioxidants in an amount of about 0.45 phr to about 0.7 phr in order to promote paint adhesion. Painted parts derived from such polyphenylene ether polyamide compositions may be advantageously utilized in the exterior body panels of automobiles, aircraft, and the like where high annealing or baking temperatures are utilized for painting the surface.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A paintable annealed article manufactured from a thermoplastic composition comprising:
   a compatibilized polyphenylene ether polyamide composition;
   carbon nanotubes, carbon black, or a combination comprising at least one of the foregoing;
   about 1 to about 20 wt % of a saturated styrenic impact modifier; and
   an amount of greater than or equal to 0.40 phr of an antioxidant, wherein the article has been annealed at temperature of greater than or equal to 165° C. for a time period of greater than or equal to 10 minutes; and wherein the composition has a specific volume resistivity of below $1 \times 10^5$ ohm-cm.

2. The article of claim 1, wherein the polyphenylene ether comprises there reaction product of 2,6-dimethylphenol and 2,3,6-trimethylphenol.

3. The article of claim 2, wherein the monomer weight ratio of 2,6-dimethylphol to 2,3,6-trimethylphanol in the polyphenylene ether is about 1:3 to about 3:1.

4. The article of claim 1 comprising carbon nanotubes wherein the carbon nanotubes have diameters of about 0.7 nanometers to about 500 nanometers.

5. The article of claim 1, wherein the carbon nanotubes are selected from the group consisting of single wall nanotubes, multi wall nanotubes and combinations comprising at least one of the foregoing carbon nanotubes.

6. The article of claim 4, further comprising carbon black.

7. The article of claim 1, further comprisiug impact modifiers selected from the group consisting of polystyrene-polybuladiene, polystyrene-polyisoprene, poly(α-methylstyrene)-polybutadiene, polystyrene-polybutadiene-polystyrene, polystyrene-polyisoprene-polystyrene, polystyrene-poly(ethylene-butylene)-polystyrene triblock copolymer, polystyrene-poly(ethylene-propylene) diblock copolymer, poly(α-methylstyrene)-polybutadiene-poly(α-methylstyrene) and combinations comprising at least one of the foregoing impact modifiers.

8. The aiticle of claim 1, wherein the antioxidant is selected from the group consisting of hindered phenols, thioesters, and combinations comprising at least one of the foregoing antioxidants.

9. The article of claim 1, wherein the antioxidants are selected from the group consisting of pentaezythritol tris ester with 3-(3,5-di-tert-butyl-4-hydroxyphenyl)propionic acid, pentaerythritol betalaurylthiopropionate and combinations comprising at least one of the foregoing antioxidants and wherein the antioxidants are added in amounts of about 0.5 to about 0.7 parts per hundred based upon the total weight of the composition.

10. The article of claim 1, wherein the antioxidants are selected from the group consisting of neopentanetetrayl tetrakis(3,5-di-tert-butyl-4-hydroxyhydrocinnamate), n-octadecyl 3,5-di-tert-butyl-4-hydroxyhydrocinnamate, 1,3,5-trimethyl-2,4,6-tris(3,5-di-tert-butyl-4-hydroxybenzyl)benzene, 1,3,5-tris(3,5-di-tert-butyl-4-hydroxybenzyl)isocyanurate, 2,6-di-tert-butyl-p-cresol, 2,2'-ethylidene-bis(4,6-di-tert-butylphenol) and combinations comprising at least one of the foregoing antioxidants.

11. The article of claim 1, wherein the antioxidants are added in an amount of about 0.5 to about 0.7 parts per hundred, based upon the total weight of the composition.

12. A method of making a paintable article comprising;
melt blending a thermoplastic composition; wherein the thermoplastic composition comprises a compatibilized polyphenylene ether polyamido composition carbon nanotubes, carbon black, or combination comprising at least one of the foregoing; about 1 to about 20 wt % based upon the total weight of the composition, of a saturated styrenic impact modifier and an amount of greater than or equal to 0.40 phr, based upon the total weight of the composition, of an antioxidant;
injection molding the melt blend to form an article;
annealing the article at a temperature of greater than or equal to 165° C. for a time period of greater than or equal to 10 minutes; and
applying paint to the article.

13. The method of claim 12, wherein the polyphenylene ether comprises the reaction product of 2,6-dimethylpbenol and 2,3,6-trimethylphenol.

14. The method of claim 12, wherein the carbon nanotubes have diameters of about 0.7 nanometer to about 500 nanometers.

15. The method of claim 12, wherein the carbon nanotubes are selected from the group consisting of single wall nanotubes, multi wall nanotubes and combinations comprising at least one of foregoing carbon nanotubes.

16. The method of claim 12, wherein the antioxidant is selected from the group consisting of hindered phenols, thioesters, and combinations comprising at least one of the foregoing antioxidants.

17. The method of claim 12, wherein the antioxidants are selected from the group consisting of pentaerythritol tris ester with 3-(3,5-di-tert-butyl-4-hydroxyphenyl)propionic acid, pentaerythritol betalaurylthiopropionate and combinations comprising at least one of the foregoing antioxidants.

18. The method of claim 12, wherein the antioxidants are selected from the group consisting of neopentanetetrayl tetrakis(3,5-di-tert-buty-4-hydroxyhydrocinnamate), n-octadecyl 3,5-di-tert-butyl-4-hydroxyhydrocinnamate, 1,3,5-trimethyl-2,4,6-tris(3,5-di-tert-butyl-4-hydroxybenzyl)benzene, 1,3,5-tris(3,5-di-tert-butyl-4-hydroybenzyl)isocyanurate, 2,6-di-tert-butyl-p-cresol, 2,2'-ethylidene-bis(4,6-di-tert-butylphenol) and combinations comprising at least one of the foregoing antioxidants.

19. The method of claim 12, wherein the antioxidant is added in an amount of about 0.5 to about 0.7 parts per hundred, based upon the total weight of the composition.

20. The method of claim 12, wherein the applying of the paint is accomplished by electrostatic painting.

21. The method of claim 12, wherein the applying of the paint is accomplished by powder painting.

22. The method of claim 12, wherein the paint has a relative bond strength greater an of equal to 4 ft-lb/0.5-inch.

23. A painted article manufactured by the method of claim 12.

24. A paintable annealed article manufactured from a thermoplastic composition comprising:
a compatibilized polyphenylene ether polyamide composition;
carbon nanotubes, carbon black or a combination comprising at least one of the foregoing;
about 1 to about 20 wt % of a saturated styrenic impact modifier; and
about 0.45 phr to about 0.68 phr of an antioxidant wherein the article has been annealed at at temperature of greater than or equal to 165° C. for a time period of greater than or equal to 10 minutes; and wherein the composition has a specific volume resistivity of below $1 \times 10^5$ ohm-cm.

25. The method of claim 24, wherein the article is manufactured from a composition comprising about 0.52 phr to about 0.66 phr of an antioxidant, based on the total weight of the composition.

26. The method of claim 24, wherein the article is manufactured a composition comprising about 0.54 phr to about 0.66 phr of an antioxidant based on the total weight of the composition.

* * * * *

UNITED STATES PATENT AND TRADEMARK OFFICE
CERTIFICATE OF CORRECTION

PATENT NO.         : 6,936,652 B2
APPLICATION NO. : 10/289664
DATED                 : August 20, 2005
INVENTOR(S)       : van Bennekom et al.

It is certified that error appears in the above-identified patent and that said Letters Patent is hereby corrected as shown below:

Column 2:
Line 23, after "comprises" delete "the"
Column 6:
Line 7, after "butyl-4-" delete "hydroxyhydrocinnamate" and insert therefor
-- hydroxyhydrocinnamate --
Column 8:
Line 27, after "4,325,863" delete "4,338,244" and insert therefor -- 4,338,224 --
Line 58, after "tetramethyl-3-" delete "oxopiperazin" and insert therefor
--oxopiperadin--.
Column 9:
Lime 3, after "(2,2,6,6-" delete "tetramethylpiperidin4" and insert therefor
-- tetramethylpiperidin-4-" --
Line 6, after "(2,2,6,6-" delete "tetramethylpiperazin" and insert therefor
-- tetramethylpiperadin --
Column 20:
Line 49, after "at" insert -- a --
Line 55, after "comprises" delete "there" and insert therefor -- the --
Line 58, after "2,6-" delete "dimethylphol" and insert therefor -- dimethylphenol --
Line 58, after "2,3,6-" delete "trimethylphanol" and insert therefor -- trimethylphenol --
Column 21:
Line 3, before "polystyrene-" delete "polybuladiene" and insert therefor
-- polybutandiene --
Line 11, after "The" delete "aiticle" and insert therefor -- article --
Line 16, after "of" delete "pentaezythritol" and insert therefor -- pentaerythritol --

UNITED STATES PATENT AND TRADEMARK OFFICE
CERTIFICATE OF CORRECTION

PATENT NO. : 6,936,652 B2
APPLICATION NO. : 10/289664
DATED : August 20, 2005
INVENTOR(S) : van Bennekom et al.

It is certified that error appears in the above-identified patent and that said Letters Patent is hereby corrected as shown below:

Column 22:
Line 29, after "greater" delete "an" and insert therefor -- than --
Line 44, after "annealed" delete "at" (first occurrence) and insert therefor -- a --
Line 54, after "manufactured" insert -- from --

Signed and Sealed this

Eighteenth Day of July, 2006

JON W. DUDAS
*Director of the United States Patent and Trademark Office*

UNITED STATES PATENT AND TRADEMARK OFFICE
CERTIFICATE OF CORRECTION

PATENT NO. : 6,936,652 B2
APPLICATION NO. : 10/289664
DATED : August 30, 2005
INVENTOR(S) : van Bennekom et al.

It is certified that error appears in the above-identified patent and that said Letters Patent is hereby corrected as shown below:

Column 2:
Line 23, after "comprises" delete "the"
Column 6:
Line 7, after "butyl-4-" delete "hydroxyhydrocinnamate" and insert therefor
-- hydroxyhydrocinnamate --
Column 8:
Line 27, after "4,325,863" delete "4,338,244" and insert therefor -- 4,338,224 --
Line 58, after "tetramethyl-3-" delete "oxopiperazin" and insert therefor
--oxopiperadin--.
Column 9:
Lime 3, after "(2,2,6,6-" delete "tetramethylpiperidin4" and insert therefor
-- tetramethylpiperidin-4-" --
Line 6, after "(2,2,6,6-" delete "tetramethylpiperazin" and insert therefor
-- tetramethylpiperadin --
Column 20:
Line 49, after "at" insert -- a --
Line 55, after "comprises" delete "there" and insert therefor -- the --
Line 58, after "2,6-" delete "dimethylphol" and insert therefor -- trimethylphenol --
Column 21:
Line 3, before "polystyrene-" delete "polybuladiene" and insert therefor
-- polybutandiene --
Line 11, after "The" delete "aiticle" and insert therefor -- article --
Line 16, after "of" delete "pentaezythritol" and insert therefor -- pentaerythritol --

UNITED STATES PATENT AND TRADEMARK OFFICE
CERTIFICATE OF CORRECTION

PATENT NO. : 6,936,652 B2
APPLICATION NO. : 10/289664
DATED : August 30, 2005
INVENTOR(S) : van Bennekom et al.

It is certified that error appears in the above-identified patent and that said Letters Patent is hereby corrected as shown below:

Column 22:
Line 29, after "greater" delete "an" and insert therefor -- than --
Line 44, after "annealed" delete "at" (first occurrence) and insert therefor -- a --
Line 54, after "manufactured" insert -- from --

This certificate supersedes certificate of correction issued July 18, 2006.

Signed and Sealed this

Twenty-ninth Day of August, 2006

JON W. DUDAS
*Director of the United States Patent and Trademark Office*